Sept. 28, 1965 L. A. RUSSELL 3,209,333

BALANCED MAGNETIC MEMORY DRIVE AND SENSE CONDUCTORS FOR CANCELLING UNWANTED FIELD EFFECTS

Filed April 15, 1960 2 Sheets-Sheet 1

INVENTOR
LOUIS A. RUSSELL

BY [signature]
ATTORNEY

Sept. 28, 1965 L. A. RUSSELL 3,209,333

BALANCED MAGNETIC MEMORY DRIVE AND SENSE CONDUCTORS FOR CANCELLING UNWANTED FIELD EFFECTS

Filed April 15, 1960 2 Sheets-Sheet 2

3,209,333
BALANCED MAGNETIC MEMORY DRIVE AND SENSE CONDUCTORS FOR CANCELLING UNWANTED FIELD EFFECTS

Louis A. Russell, Poughkeepsie, N.Y., assignor to International Business Machines Corporation, New York, N.Y., a corporation of New York Filed Apr. 15, 1960, Ser. No. 22,541
10 Claims. (Cl. 340—174)

This invention relates to switching circuits and memories and more particularly to the construction of switching circuits and storage matrices employing open flux path magnetic bistable elements wherein unwanted electrical and magnetic field coupling between conductors coupling the elements is substantially eliminated.

Open flux path elements may be characterized as elements whose material defines a portion of a closed flux path. Such elements may take the form of a bistable element made of thin magnetic films or a splinter. Various circuits and matrices employing bistable elements made of thin magnetic films or splinters have heretofore been employed to perform various functions, however the problem of noise generation in the sense or output line associated with such elements due to unwanted electrical and magnetic field coupling beween conductors coupling the elements has been a serious problem since the output signal obtainable from such elements is small requiring stringent detection techniques.

The noise problem associated in such circuits is eliminated by construction of circuits in accordane with the teachings of this invention wherein the drive conductors associated with each element are arranged symmetrically about the sense conductor. Any pair of conductors is then energized by a balanced current input so that one conductor passes current in one direction and the other passes current in the other direction such that the conductors assume equal and opposite polarities. Due to the symmetry and balanced current drive, the unwanted noise generated in the sense conductor due to electrical and magnetic coupling between any pair of conductors is substantially eliminated.

Accordingly, it is a prime object of this invention to provide a novel circuit structure for open flux path magnetic elements.

Another object of this invention is to provide a novel circuit for open flux path magnetic elements wherein unwanted electrical and magnetic coupling between drive and output conductors is substantially eliminated.

A further object of this invention is to provide a novel circuit arrangement for open flux path magnetic elements wherein the drive conductors associated therewith are arranged symmetrical about the output conductor whereby unwanted coupling between the drive conductors is eliminated.

Still another object of this invention is to provide a novel structure for a storage matrix employing open flux path magnetic elements.

The foregoing and other objects, features and advantages of the invention will be apparent from the following more particular description of preferred embodiments of the invention, as illustrated in the accompanying drawings.

Generally, magnetic material may be considered as containing a multiplicity of small magnetically saturated regions which are called domains. In demagnetized materials, these domains are randomly positioned so that the resultant magnetization of the specimen is zero. Movement of the domains may be accomplished by rotation and by domain wall motion. In rotation the magnetic moment, which is representative of each domain within the material, rotates similar to a compass needle. This type rotational magnetization provides very high switching speeds when switching from one to another stable magnetic state. Domain wall switching, on the other hand, is generally a slower process in which changes of magnetization occur by the growth of domains parallel to the applied field at the expense of domains oriented antiparallel to the applied field.

Certain elements exhibit the characteristic of uniaxial anisotropy wherein the magnetic elements in the material tend to align themselves along an easy axis of magnetization. This characteristic may be produced in thin films of magnetic material which are in the order of 100–10,000 Angstroms in thickness but it should be noted, however, that other geometric forms also exhibit this characteristic under certain conditions.

Figures 1, 2:
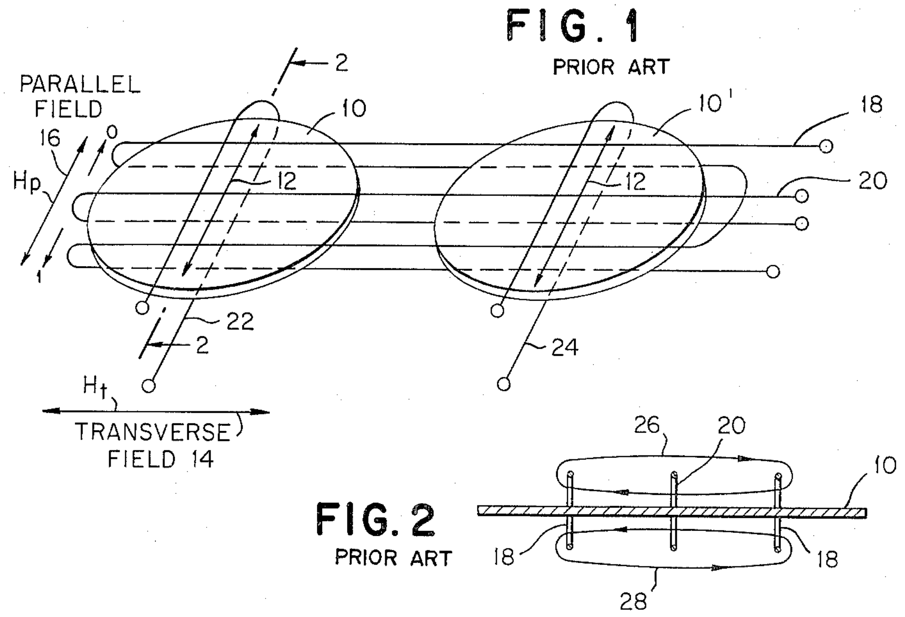
FIG. 1 is a fragmentary portion of a switching circuit employing open flux path magnetic elements of the prior art.
FIG. 2 is a sectional view of one of the elements of FIG. 1.

Referring to the FIG. 1, a magnetic element 10 and 10′ is provided having a composition of approximately 83% nickel and 17% iron. The material is evaporated or otherwise deposited by suitable means on a substrate, not shown, usually of glass, in a high vacuum ($10^{-6}$ mm. Hg) to a thickness of approximately 2600 Angstroms in the presence of a magnetic field such that the deposited material has a uniaxial anisotropy characteristic, i.e., a single axis of easy magnetization 12, along which the magnetic moments of the material tend to align. The preferred direction of magnetization 12 of each film 10 is then the resultant direction along which all the magnetic moments within the film 10 tend to align themselves. A magnetic field which is applied transverse to the preferred or easy axis of magnetization 12 of the film 10 or 10′ is represented by a double headed arrow 14, which may be symbolized by, and is hereinafter referred to, as $H_t$. A transverse field, $H_t$, may be defined as a magnetic field applied parallel to the plane of the film 10 in such a direction as to produce a field perpendicular to the easy axis 12. The magnetic field which is applied parallel to the preferred direction of magnetization 12 of the film 10 is represented by a double headed arrow 16, which may be symbolized by, and is hereinafter referred to, as $H_p$. A parallel field, $H_p$ may be defined as a magnetic field applied parallel to the plane of the film 10 in such a direction as to produce a field parallel to the easy axis 12 of the film 10. It should be noted that both type fields $H_t$ and $H_p$ may be applied in either direction as indicated by the double headed arrows 14 and 16, respectively. In order to provide a designation for the directions of the resultant magnetization vectors which the films 10 may assume, one stable magnetic state is designated the 0 state, while the other is designated the 1 state, in representing binary information and is so indicated in the figure.

Switching the state of any one of the films 10, from the 0 to the 1 state, or from the 1 to the 0 state, may be accomplished by applying a field $H_t$ and $H_p$ in at least partial coincidence. The field $H_t$ applies a torque in all the moments within the elements 10 to start rotation of the magnetization vector in either the clockwise or the counterclockwise direction, depending upon the direction of the field. Under the influence of the field $H_t$, the magnetization vector of the films 10 or 10′ rotate toward a maximum of 90° with respect to the preferred direction of magnetization 12. With the combination of the field $H_p$ applied in coincidence with the field $H_t$, it may be seen that the magnetization vector rotates toward the 0 state or from the 0 toward the 1 state, depending upon the direction of the field $H_p$. The final state assumed by the films 10 or 10′ upon termination of all fields is not dependent upon the direction of the applied field $H_t$ but is dependent upon the direction of the applied field $H_p$.

As is shown in the FIG. 1, the elements 10 and 10′ are coupled by a bit drive line 18 and a sense line 20, while the element 10 is coupled by a word drive line 22 with the element 10′ coupled by a word drive line 24. As may be seen, energization of the bit drive line 18 applies a field $H_p$ to both the elements 10 and 10′ while energization of the word drive lines 22 and 24 of the elements 10 and 10′, respectively, applies a field $H_t$. The FIG. 1 depicts a fragmentary portion of coincident selection memory employing magnetic thin films as the storage medium. A typical writing operation is provided by addressing a given word drive line, say the line 22, and appropriately energizing the bit drive line 18, causing switching of the element 10 from the 0 to the 1 state. A typical read operation is achieved by again energizing the word line 22 and bit drive 18 with reverse polarity signals. A non-destructive type read operation may be achieved by energizing the word drive line 22 to cause the magnetization of the element 10 to rotate toward an angle of 90° with respect to the easy direction 12 and thereafter terminate the drive to the line 22 whereupon the magnetization of element 10 snaps back to its original stable state, 0 or 1.

Reference is now made to the FIG. 2, which is a cross section view of the element 10 depicting the bit drive line 18 and the sense line 20 only. When the drive line 18 is energized, as described above, both the drive and the sense lines 18 and 20, respectively, are linked by lines of flux 26 and 28, as is shown in the figure. Since both the drive line 18 and the sense line 20 are linked by the same lines of flux, 26 and 28, which are in the same direction, there is a large mutual coupling resulting in a large noise signal induced on the sense line 20. This noise must be allowed to dissipate before a signal is capable of being detected on the sense line 20.

Figure 3:
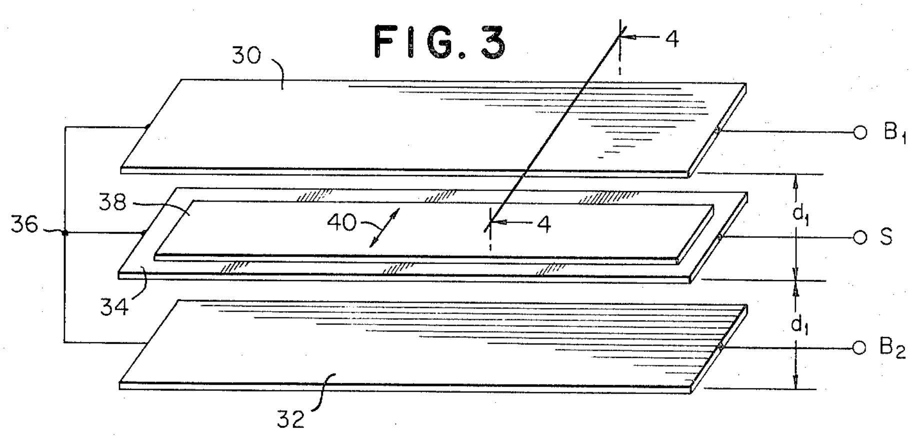
FIG. 3 is a circuit in accordance with one embodiment of this invention.

Referring to the embodiment of FIG. 3, a portion of a memory, or a switching circuit, constructed in accordance with this invention, is shown wherein a pair of substantially congruent bit drive conductors 30 and 32 are provided and a sense conductor 34 with one end of the conductors 30, 32 and 34 connected to a terminal 36 and the other end of the conductors having terminals $B_1$, $B_2$ and S, respectively. Each of the conductors 30 and 32 are positioned substantially equidistant from the sense conductor 34, as is illustrated and designated by distance $d_1$. Adjacent the sense conductor 34 the elements 10 and 10′, illustrated in the FIG. 1, may be provided, or, as shown in FIG. 3, a continuous magnetic film 38 may be provided having an easy axis, or preferred direction of magnetization 40.

Assuming a drive current which is balanced to be applied to the terminals $B_1$ and $B_2$ to the bit drive conductors 30 and 32, respectively, then there is no unbalance of electrical potential on the sense conductor 34 and hence the potential at the terminal S is zero. Assuming that the input current is directed into the terminal $B_1$ and is positive and hence the current out of the terminal $B_2$ is negative, then the flux associated with the conductors 30 and 34 and that associated with the conductors 32 and 34 are equal and opposite, inducing no net voltage in the sense line 34.

Figure 4:
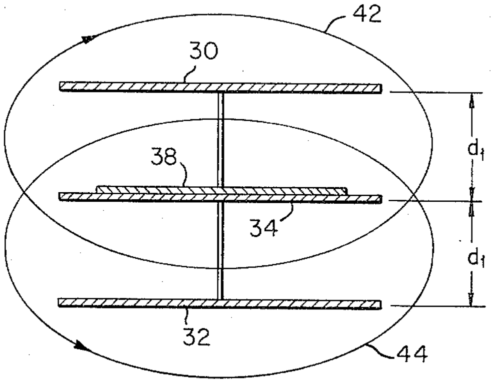
FIG. 4 is a sectional view of the circuit arrangement of FIG. 3.

To fully comprehend the above-stated phenomena, reference is made to the FIG. 4 which is a cross sectional view of the embodiment of FIG. 3. In the conductor 30 current is directed into the drawing and hence the flux line 42 is shown coupling both conductors 30 and 34 having a clockwise direction, while the current in the conductor 32 is directed out of the drawing and a flux line 44 is shown coupling both the conductors 32 and 34 having a counterclockwise direction.

The applied field to the magnetic film 38 is shown to be additive and directed parallel to the easy direction 40 thereof while the lines of magnetic flux 42 generated by the current in the conductor 30, which enclose the sense conductor 34, are equal and opposite to these lines of magnetic flux 44 generated by the current in the conductor 32 which link the sense conductor 34 resulting in zero net linkage of magnetic flux in the conductor 34 generated by the current in both conductors 30 and 32.

Figure 5:
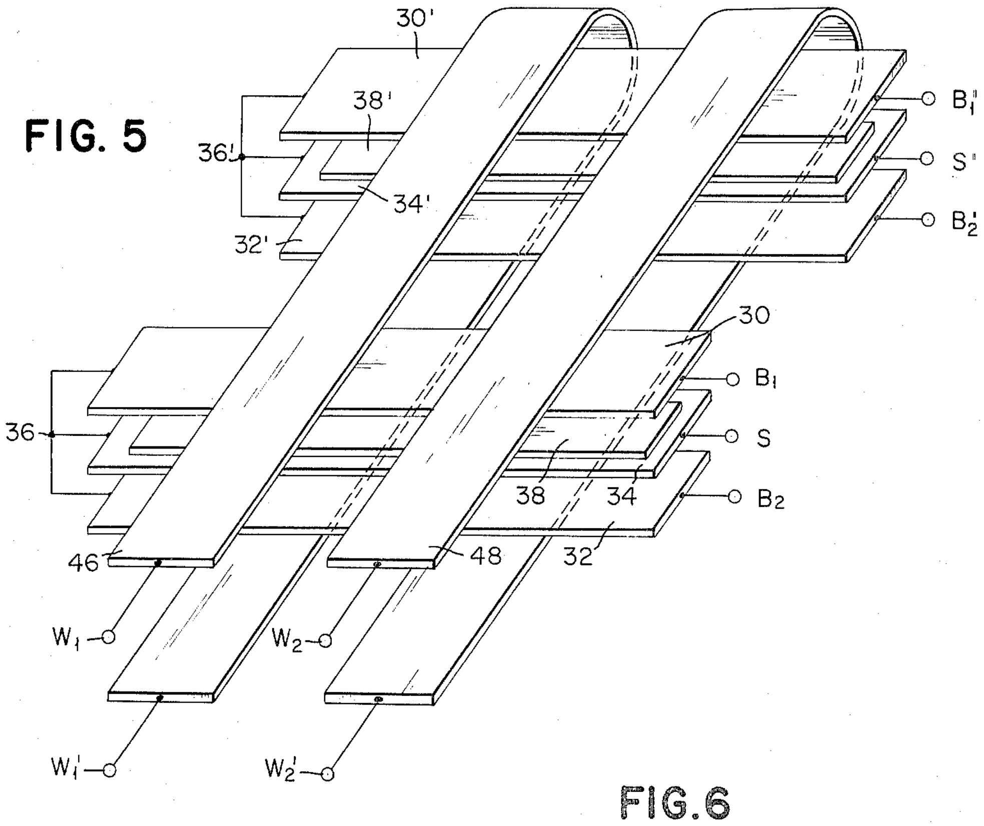
FIG. 5 illustrates another embodiment of this invention.

Referring to the FIG. 5, a 2 x 2 memory is shown. The embodiment for the bit drive shown in the FIG. 3 is again employed in this matrix configuration, and similar reference characters are utilized for clarity. In the FIG. 5, there is provided, coupling each of the two rows of elements, designated by the configuration as shown in the FIG. 3, a word drive conductor 46 having terminals $W_1$ and $W_1'$ and a word drive conductor 48 having terminals $W_2$ and $W_2'$. As shown, each of the conductors 46 and 48 is a strip conductor and positioned symmetrical about the sense conductor 34 and 34′. A memory position is then defined by the area of the magnetic film 38 common to both the bit conductors 30 and 32 and the word conductors 46 and 48. As stated above, energization of the conductors 46 and 48, provides a field $H_t$ which is, by definition, transverse to the easy direction 40 of the film 38 and therefore energization thereof may take the form of either polarity impulses. It should be noted that the word drive lines 46 and 48 may also be constructed to provide a balanced drive and as such provide a similar type decoupling effect as stated above for the bit sense drive lines 30 and 32.

Figure 6:
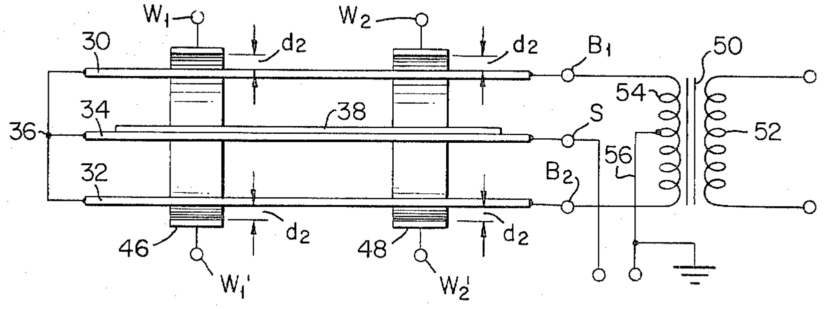
FIG. 6 is a side view of the embodiment of FIG. 5.
Figure 7:
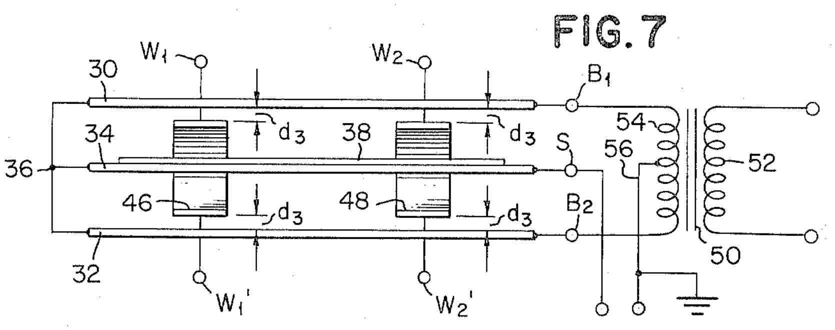
FIG. 7 illustrates another embodiment of this invention.

Referring now to the FIGS. 6 and 7, an end view of different embodiments of the array of FIG. 5 is shown wherein the word drive lines 46 and 48 are symmetrical about the sense conductor 34, as are the bit drive lines 30 and 32. In the FIG. 6, the word drive lines 46 and 48 are shown to be positioned about and equidistant from the bit drive lines 30 and 32 by a distance $d_2$, as indicated in the figure, while the word drive lines 46 and 48 in the FIG. 7 are shown to be positioned intermediate the sense and bit drive conductors, 34 and 30, 32, respectively, equidistant from the sense conductor 34 defined by a distance $d_3$ from the conductors 30 and 32. It should then be noted that what is required is symmetry of the drive conductors about the sense conductor and in combination with such a structure means to provide a balanced current impulse to both the conductors 30 and 32. Also provided in both the FIGS. 6 and 7 is one means of providing a balanced drive, here balanced to ground, to both the conductors 30 and 32 in the form of a transformer core 50 having a primary winding of 52 and a secondary winding of 54 with the secondary winding 54 center tapped to ground by a conductor 56. One side of the secondary winding 54 is connected to the terminal $B_1$ of drive conductor 30 while the other end is connected to the terminal $B_2$ of conductor 32.

Although one form of a balanced current impulse to both the drive lines 30 and 32 is shown in both the FIGS. 6 and 7, it should be realized that connection of each individual conductor 30 and 32 to a separate transformer may be employed so that each conductor 30 and 32 passes current in one and an opposite sense, respectively. In this latter arrangement, the connection of each conductor 30 and 32 to the terminal 36 also connecting the sense conductor 34 would be eliminated.

Further, in considering the above embodiments of this invention, since switching of a particular element requires the presence of both a transverse and a parallel field, $H_t$ and $H_p$ respectively, the elements could be positioned such that only one drive line is needed. Such a drive line would provide a resultant field having the necessary components of the fields $H_t$ and $H_p$.

While the invention has been particularly shown and described with reference to preferred embodiments thereof, it will be understood by those skilled in the art that various changes in form and details may be made therein without departing from the spirit and scope of the invention.

What is claimed is:

1. A memory matrix comprising, a plurality of magnetic elements made of material exhibiting an easy axis of magnetization defining different stable states of flux orientation, each said elements defining a portion of a closed flux path, said elements being arranged in columns and rows, a plurality of pairs of row conductors and a plurality of row sense conductors, each respective pair of row conductors and a respective one of said row sense conductors coupling all the elements in a different row and each one of said respective sense conductors being located intermediate and equidistant from said respective pair of row conductors, a plurality of column conductors, each column conductor coupling all the elements of a different column, said column conductors positioned symmetrically about said sense conductors and equidistant from the nearest intermediate sense conductor, and means for selectively energizing a column conductor and a pair of row conductors to switch a desired element coupled thereby from one stable state to another including means for energizing said selected pair of row conductors with a balanced current impulse whereby an output signal is induced on one of said row sense conductors substantially free of unwanted electrical and magnetic field coupling.

2. A memory matrix comprising, a plurality of magnetic elements made of material exhibiting an easy axis of magnetization defining different stable states of flux orientation, each said element defining a portion of a closed flux path, said elements being arranged in columns and rows, a plurality of pairs of row conductors and a plurality of row sense conductors, each respective pair of row conductors and a respective one of said row sense conductors connected at one end to couple all the elements in a different row and each one of said respective sense conductors being located intermediate and equidistant from said respective pair of row conductors, a plurality of column conductors, each column conductor coupling all the elements of a different column, said row and column conductors positioned symmetrically about said sense conductors and equidistant from the nearest intermediate sense conductor, and means for selectively energizing a column conductor and a pair of row conductors to switch a desired element coupled thereby from one stable state to another including means for energizing said selected pair of row conductors with a balanced current impulse each said selected pair of row conductors receiving equal current impulses in opposite relative directions whereby an output signal is induced on one of said row sense conductors substantially free of unwanted electrical and magnetic field coupling.

3. The memory of claim 2, wherein each said pair of row conductors is of equal length and in the form of a strip conductor.

4. The memory of claim 2 wherein each said pair of row conductors is of equal length and width and in the form of a strip conductor.

5. The memory of claim 2, wherein each column conductor is positioned intermediate said row conductors and said sense conductor.

6. The memory of claim 2, wherein said row conductors are positioned intermediate said column conductors and said sense conductor.

7. The memory of claim 2, wherein each said pair of row conductors is congruent to one another and each said column conductor is of equal width.

8. In a circuit, an element made of magnetic material exhibiting an easy axis of magnetization defining opposite stable states of flux orientation, said element defining a portion of a closed flux path, a sense conductor and a pair of input conductors coupling said element, said pair of input conductors and said sense conductor each lying in separate parallel planes equally spaced from one another with said sense conductors lying between said input conductors, means connecting said pair of input conductors and said sense conductor at one end, and means including means for energizing said pair of input conductors with a balanced current input to cause current in one said input conductor to flow toward said end and current in the other said input conductor to flow away from said end, and to cause a flux change in said element whereby an output signal is induced on said sense conductor free of unwanted electrical and magnetic field coupling between portions of said pair of input conductors and said sense conductor.

9. The circuit of claim 8 wherein said material of said element is a thin ferromagnetic film lying in a plane parallel to the planes of said input and sense conductors, and positioned adjacent to said sense conductor.

10. The circuit of claim 9 wherein said sense conductor couples said element transverse to the easy axis of said element.

References Cited by the Examiner

UNITED STATES PATENTS

| | | | |
|---|---|---|---|
| 3,023,402 | 2/62 | Bittmann | 340—174 |
| 3,048,829 | 8/62 | Bradley | 340—174 |
| 3,077,586 | 2/63 | Ford | 340—174 |

FOREIGN PATENTS 225,970 12/59 Australia.

OTHER REFERENCES

Pages 64–69, 1955, "Experiments in Three-Core Cell," J. Raffel IRE Convention Record, Part 4, Computers and Information Theory.

Pages 120–123, Dec. 10–12, 1956, "A Compact Coincident Current Memory," A. V. Pohm, Proceedings of the Eastern Joint Computer Conference.

Pages 22–23, February 10, 1960, Publication III, "Thin Magnetic Films for Logic and Memory," by W. E. Proebster and H. J. Ogvey, International Solid-State Circuits Conference.

IRVING L. SRAGOW, *Primary Examiner.*

EVERETT R. REYNOLDS, BERNARD KONICK, *Examiners.*